No. 617,932. Patented Jan. 17, 1899.
P. F. MAHAN.
HOG SCALDING TUB.
(Application filed Feb. 9, 1898.)
(No Model.)
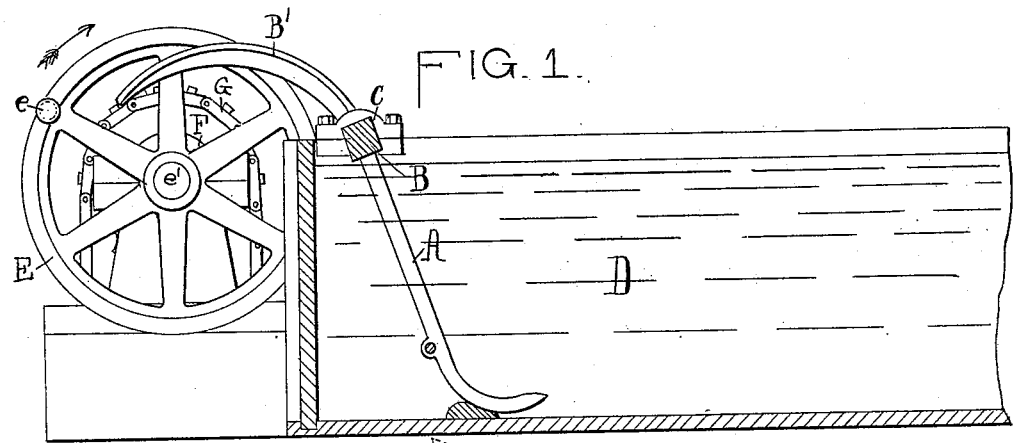
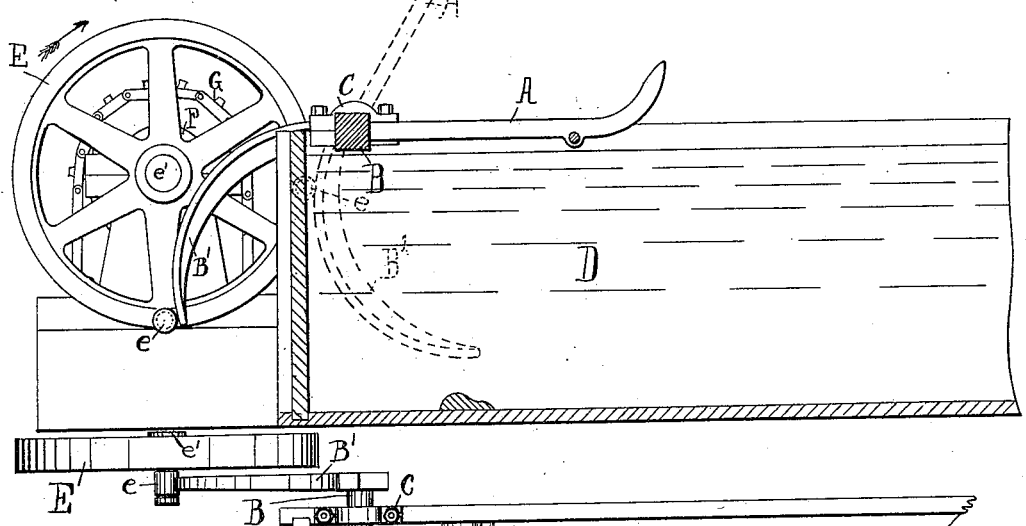
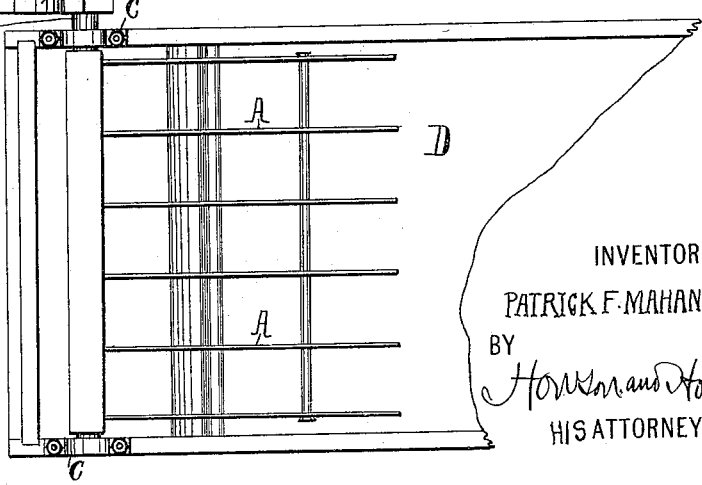
WITNESSES:
INVENTOR
PATRICK F. MAHAN
BY
HIS ATTORNEYS.

UNITED STATES PATENT OFFICE.

PATRICK F. MAHAN, OF JERSEY CITY, NEW JERSEY, ASSIGNOR OF ONE-HALF TO GEORGE B. WILSON, OF SAME PLACE.

HOG-SCALDING TUB.

SPECIFICATION forming part of Letters Patent No. 617,932, dated January 17, 1899.

Application filed February 9, 1898. Serial No. 669,686. (No model.)

*To all whom it may concern:*

Be it known that I, PATRICK F. MAHAN, a citizen of the United States of America, residing in Jersey City, county of Hudson, State of New Jersey, have invented Improvements in Hog-Scalding Tubs, of which the following is a specification.

The object of my invention is to simplify the construction of the hog-lifting mechanism of a scalding-tub and at the same time to lessen the labors of the operators and reduce the inconveniencies to which the operators are ordinarily subjected. This object I attain as hereinafter described.
In the accompanying drawings, Figure 1 is a sectional elevation of the discharging end of a hog-scalding tub provided with my improvements. Fig. 2 is a similar view illustrating the hog lifting and discharging rake in different positions, and Fig. 3 is a partial plan view of Fig. 2.

Hog-scalding tubs are commonly provided with swinging aprons or rakes to lift the scalded hogs out of the water in the tub and discharge them onto a table or chute, these rakes normally remaining inactive with their outer ends resting in the bottom of the tub until the operator throws a clutch to connect the rake with power-driven operating mechanism. It is time-consuming and inconvenient for the operator to work the clutch as well as attend to the hogs being scalded, and ordinarily the mechanism allows the lifting-rake to drop back into the scalding water with a splash, which is often troublesome to a near-by operator. To avoid these difficulties, I dispense with all clutch devices and provide a rake-operating mechanism which moves continuously and automatically without attention from the operator, but causes the lifting-rake to rise out of the water intermittently and steadily and to return without a splash. The lifting movements of the rake are so timed that the operator will have a scalded hog ready to be floated over into the path of the rake each time it rises.

In the accompanying drawings, A is the rake, the shaft B of which is mounted to oscillate in suitable bearings C at one end of the tub D. The outer end of the shaft of the rake is provided with an arm B', which is cam-shaped and lies in the path of and is adapted to be acted on by a roller-pin $e$ on the revolving wheel E. This wheel is mounted on a suitable shaft $e'$ to turn in bearings F and having a gear-wheel or chain-wheel G or other suitable means by which the shaft and wheel may be continuously operated under power. The wheel is rotated in the direction of the arrow, Figs. 1 and 2, and at each revolution the crank-pin $e$ comes in contact with the cam-arm B' to swing the lifting-rake A from the position shown in Fig. 1 to the position shown by dotted lines in Fig. 2, thus lifting the scalded hog which has been moved into its path out of the water in the tub and discharging it onto a suitable table or chute at the end of the tub. As the wheel revolves and the rake returns from the position shown by dotted lines in Fig. 2 to the position shown by full lines therein it continues under the control of the crank-pin of the wheel owing to the shape of the cam-arm B', so that the rake returns during the first part of this movement steadily until it is about to enter the water, into which it then descends with practically no splash.

I claim as my invention—

1. The combination of the lifting and discharging rake of a scalding-tub, with a continuously-driven operating mechanism provided with means arranged to act periodically and automatically on the rake, and to maintain its engagement during the first part of the return movement of the rake, substantially as described.

2. The combination of the lifting and discharging rake of a scalding-tub having a cam-arm with a rotating shaft having a crank-pin adapted to act on the said cam-arm and remain in control thereof during the first part of the return movement of the rake, as and for the purpose set forth.

In testimony whereof I have signed my name to this specification in the presence of two subscribing witnesses.

PATRICK F. X MAHAN.
his mark

Witnesses:
F. WARREN WRIGHT,
HUBERT HOWSON.